(12) United States Patent
Watanabe et al.

(10) Patent No.: US 6,295,107 B1
(45) Date of Patent: Sep. 25, 2001

(54) LIQUID CRYSTAL DISPLAY WITH SHIELDING LAYER FOR PASSING PARALLEL RAYS OF LIGHT INTO MICRO-LENS ARRAY

(75) Inventors: Takanori Watanabe, Atsugi; Katsumi Kurematsu, Hiratsuka; Osamu Koyama, Hachioji, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/186,645

(22) Filed: Nov. 6, 1998

(30) Foreign Application Priority Data

Nov. 7, 1997 (JP) ................................................. 9-305574

(51) Int. Cl.$^7$ ...................... G02F 1/1335; G02F 1/1333
(52) U.S. Cl. .............................................. 349/95; 349/110
(58) Field of Search ................................. 349/95, 110, 44, 349/111; 359/365, 366

(56) References Cited

U.S. PATENT DOCUMENTS

| | | | |
|---|---|---|---|
| 5,451,766 | * 9/1995 | Van Berkel | 349/95 |
| 5,508,834 | * 4/1996 | Yamada et al. | 359/83 |
| 5,543,942 | * 8/1996 | Mizuguchi et al. | 359/40 |
| 5,554,251 | * 9/1996 | Watanabe et al. | 156/379.8 |
| 5,555,476 | * 9/1996 | Suzuki et al. | 349/95 |
| 5,561,538 | * 10/1996 | Kato et al. | 359/40 |
| 5,666,176 | 9/1997 | Kurematsu | 349/95 |
| 5,682,215 | * 10/1997 | Nishihara et al. | 349/95 |
| 5,771,085 | * 6/1998 | Ochi et al. | 349/158 |
| 5,808,712 | * 9/1998 | Hishida et al. | 349/95 |
| 5,844,644 | * 12/1998 | Oh et al. | 349/95 |
| 5,847,795 | 12/1998 | Satoh et al. | 349/137 |
| 5,990,992 | * 11/1999 | Hamanaka et al. | 349/95 |

FOREIGN PATENT DOCUMENTS

| | | |
|---|---|---|
| 2 278 222A | * 11/1994 | (GB). |
| 63-124029 | * 5/1988 | (JP). |
| 5-11240 | * 1/1993 | (JP). |
| 5-273512 | * 10/1993 | (JP). |
| 7-261164 | * 10/1995 | (JP). |
| 6-148627 | * 10/1997 | (JP). |
| 9-258195 | * 10/1997 | (JP). |

* cited by examiner

*Primary Examiner*—William L. Sikes
*Assistant Examiner*—Tarifur R. Chowdhury
(74) *Attorney, Agent, or Firm*—Fitzpatrick, Cella, Harper & Scinto

(57) ABSTRACT

Areas of the micro-lenses of a liquid crystal display apparatus where aberration is remarkable are shielded from light and the accuracy of alignment of the components of the apparatus is improved. The liquid crystal display apparatus comprises a plurality of pixel electrodes adapted to be charged with electricity according to video signals and arranged two-dimensionally on a semiconductor substrate, a liquid crystal layer arranged on said plurality of pixel electrodes, a transparent electroconductive film arranged on said liquid crystal layer and a plurality of micro-lenses adapted to focusing rays of polarized light entering them from above respectively on the corresponding pixel electrodes and arranged on the transparent substrate and above said transparent electroconductive film and is characterized in that a light-shielding layer is arranged on said plurality of micro-lenses to block the rays of light entering a peripheral area of each of said plurality of micro-lenses.

18 Claims, 13 Drawing Sheets

SECTIONAL VIEW ALONG 4-4 IN FIG.3

SECTIONAL VIEW ALONG 7A-7A IN FIG.7B

SECTIONAL VIEW ALONG 8B-8B IN FIG.8A

1042: B-REFLECTION DICHROIC MIRROR SPECTRUM REFLECTION CHARACTERISTICS

1041: B/G REFLECTION DICHROIC MIRROR SPECTRUM REFLECTION CHARACTERISTICS

1040: R-REFLECTION DICHROIC MIRROR SPECTRUM REFLECTION CHARACTERISTICS

LIQUID CRYSTAL DISPLAY WITH SHIELDING LAYER FOR PASSING PARALLEL RAYS OF LIGHT INTO MICRO-LENS ARRAY

BACKGROUND OF THE INVENTION

1. Field of the Invention

This invention relates to a liquid crystal display apparatus and, more particularly, it relates to a liquid crystal display apparatus comprising a micro-lens array.

2. Related Background Art

Known micro-lens arrays include those that can be formed on a transparent substrate covered by a light-shielding film having a given pattern as disclosed in Japanese Patent Application Laid-Open No. 7-261164. This patent document describes a method of producing micro-lenses by utilizing the surface tension of molten resin. However, lenses produced by such a method gives rise to aberration to a considerable extent in a peripheral area of the lens. This aberration problem that occurs in a peripheral area of micro-lens is normally bypassed by using a light-shielding underlayer. However, such a technique is accompanied by problems, which will be discussed below.

FIG. 13 of the-accompanying drawings is a schematic cross sectional view of a structure comprising known micro-lenses. Such a structure is typically prepared by forming a light-shielding layer 702 on a transparent substrate 701, applying a photosensitive resin material onto the substrate and thereafter exposing it to light and developing the latent image to leave the photosensitive material as dots only in areas corresponding to the pixel array to be used with it. The photosensitive resin left on the substrate as dots is then molten and transformed into micro-lenses by utilizing the surface tension of the resin material to produce a structure 703 as shown in FIG. 13. While rays of light such as those denoted by 704, 705, 706 in FIG. 13 that enter a micro-lens at and near the center thereof may be converged to the focal point 707 of the lens, those entering the micro-lens at a peripheral area thereof such as ray of light 708 is not accurately brought to the focal point 707 but follows the route indicated by 709 because of the aberration of the micro-lens is particularly remarkable in the peripheral area. As a result, the converged rays of light show a light spot having a relatively large diameter. While, theoretically, the ray of light 708 is supposed to be blocked by the light-shielding layer 702 after entering the corresponding micro-lens 703, it actually passes through the corresponding aperture of the light-shielding layer 702 and leaves the substrate from the lower surface thereof as shown. When such known micro-lenses are used in a liquid crystal display apparatus designed to contain a large number of small pixels in order to display finely defined images, the rays of light entering each micro-lens have to be converged to produce a very small spot of light. Then, obviously, the above pointed out problem adversely affects the effort of improving the brightness and the contrast of the image to be displayed on the liquid crystal display apparatus.

There arises another problem as will be described below when known micro-lenses are used for liquid crystal display apparatus and photosensors. Normally, the circuit substrate of a display apparatus or a photosensor is prepared by way of a semiconductor process independently from the process of producing micro-lenses before they are bonded together in a well aligned fashion to become integral with each other. A high degree of accuracy is required for aligning them with each other particularly when small pixels are used. For instance, if each pixel is about 10 microns large in an TN type transmission liquid crystal display apparatus, each pixel electrode is required to have a size of about 9 microns in order to satisfactorily separate adjacently located pixels. A phenomenon referred to as disclination of liquid crystal occurs in a peripheral area of the pixel electrodes to make it impossible to uniformly control the orientation of the liquid crystal and therefore to effectively utilize them in a peripheral area of about 2.5 microns. The contrast and the gradation of the image displayed on the display apparatus will be degraded if the light-shielding effect is not perfect in this area. Taking additionally the above pointed out problem of the diameter of each spot of light into consideration, the allowable dimensional error for the alignment of the micro-lenses and the circuit substrate will be less than 1 micron when the spot diameter is 3 micron because 9−2.5−2.5−3=1, which may be too rigorous to the process of manufacturing liquid crystal display apparatus. While there is a known technique of forming alignment marks, utilizing the light-shielding layer, the marks formed in the light-shielding layer are used for both the operation of patterning for the micro-lenses and that of aligning the circuit substrate and the micro-lenses because the micro-lenses are subjected to the patterning operation after forming the light-shielding layer. FIG. 14 shows alignment marks 801 in cross section. However, with the use of such alignment marks, it will be difficult to reduce the error of the alignment of the pixel electrodes and the micro-lenses to a desired level if the alignment marks are displaced relative to the micro-lenses even when the error of the alignment of the circuit substrate and the micro-lenses is reduced to less than 1 micron.

Thus, the above discussed problems have been baffling the past efforts for arranging more pixels in a liquid crystal display apparatus and improving the brightness and the contrast of the displayed image when known micro-lenses are used for a liquid crystal display apparatus.

SUMMARY OF THE INVENTION

In view of the above identified problems, it is therefore the object of the present invention to provide a liquid crystal display apparatus wherein the aberration production areas of the micro-lenses are shielded from light and the accuracy of the alignment of the circuit substrate and the micro-lenses is improved.

According to an aspect of the invention, the above object is achieved by providing a liquid crystal display apparatus comprising a light source, a transparent substrate carrying thereon a light-shielding layer adapted to selectively blocking rays of light emitted from the light source and a micro-lens array, a circuit substrate carrying thereon a plurality of pixel electrodes and liquid crystal pinched between the transparent substrate and the circuit substrate and driven by the pixel electrodes to modulate the rays of light from the light source and display optical images, characterized in that the light-shielding layer have apertures and the rays of light from the light source pass through the respective micro-lenses after passing through the corresponding apertures and before entering the liquid crystal.

Preferably, in a liquid crystal display apparatus according to the invention, each of the micro-lenses has a curved surface for converging rays of light from the light source and the rays of light from the light source pass through the respective curved surfaces of the micro-lenses after passing through the corresponding apertures of the light-shielding layer and before entering the liquid crystal.

Preferably, in a liquid crystal display apparatus according to the invention, the rays of light from the light source are made to enter the respective micro-lenses in a plurality of different directions and the pitch of arrangement of the micro-lenses is as high as an integer-fold of the pitch of arrangement of the pixel electrodes.

Preferably, in a liquid crystal display apparatus according to the invention, alignment marks are formed by using the material same as that of the micro-lenses in order to bond said transparent substrate and the circuit substrate.

Still preferably, in a liquid crystal display apparatus according to the invention, alignment marks are formed by using the material same as that of the light-shielding layer in order to bond the transparent substrate and the circuit substrate.

According to another aspect of the invention, there is provided a liquid crystal display apparatus comprising a plurality of pixel electrodes adapted to be charged with electricity according to video signals and arranged two-dimensionally on a semiconductor substrate, a liquid crystal layer arranged on the plurality of pixel electrodes, a transparent electroconductive film arranged on the liquid crystal layer and a plurality of micro-lenses adapted to focusing rays of polarized light entering them from above respectively on the corresponding pixel electrodes and arranged on the transparent substrate and above the transparent electroconductive film, characterized in that a light-shielding layer is arranged on the plurality of micro-lenses to block the rays of light entering a peripheral area of each of the plurality of micro-lenses.

According to still another aspect of the invention, there is provided a liquid crystal display apparatus comprising a plurality of pixel electrodes adapted to be charged with electricity according to video signals and arranged two-dimensionally on a semiconductor substrate, a liquid crystal layer arranged on the plurality of pixel electrodes, a transparent electroconductive film arranged on the liquid crystal layer and a plurality of micro-lenses adapted to focusing rays of polarized light entering them from above respectively on the corresponding pixel electrodes and arranged on the transparent substrate and above the transparent electroconductive film, characterized in that the plurality of micro-lenses is plane at the upper surface and convex at the lower surface and a light-shielding layer is arranged in the recesses formed at the boundaries of the plurality of micro-lenses.

According to still another aspect of the invention, there is provided a liquid crystal display apparatus comprising a plurality of pixel electrodes adapted to be charged with electricity according to video signals and arranged two-dimensionally on a semiconductor substrate, a liquid crystal layer arranged on the plurality of pixel electrodes, a transparent electroconductive film arranged on the liquid crystal layer and a plurality of micro-lenses adapted to focusing rays of polarized light entering them from above respectively on the corresponding pixel electrodes and arranged on the transparent substrate and above the transparent electroconductive film, characterized in that the plurality of micro-lenses is convex at the upper surface and plane at the lower surface and a light-shielding layer is arranged in the recesses formed at the boundaries of the plurality of micro-lenses.

Preferably, liquid crystal display apparatus according to the invention further comprises alignment marks formed on the semiconductor substrate during the process of forming the plurality of pixel electrodes and having a profile same as that of the pixel electrodes and alignment marks formed on the transparent substrate during the process of forming said plurality of micro-lenses and having a profile same as that of the micro-lenses, the electrode-like alignment marks and the micro-lens-like alignment marks are respectively aligned relative to each other.

Preferably, in a liquid crystal display apparatus according to the invention, the pitch of arrangement of the micro-lenses is as high as an integer-fold of the pitch of arrangement of the pixel electrodes.

When the pitch of arrangement of the micro-lenses is as high as an integer-fold of the pitch of arrangement of the pixel electrodes, the integer is preferably equal to 2.

According to a further aspect of the invention, there is provided a method of manufacturing a liquid crystal display apparatus comprising a step of forming a light-shielding layer on a plurality of micro-lenses showing projections and recesses by applying a light-reflecting or light-shielding material to cover the projections and recesses and removing the light-reflecting or light-shielding material by polishing or etching except the recesses.

According to a further aspect of the invention, there is provided a method of forming micro-lenses and a light-shielding layer in a liquid crystal display apparatus according to the invention, the method comprising steps of applying a resin material onto the transparent substrate;

removing the resin material by exposure or development from the boundaries of the micro-lenses to be formed;

forming micro-lenses by melting the resin material and utilizing the surface tension of the molten resin material;

applying a light-shielding material onto the micro-lenses; and removing the light-shielding material by etching or polishing except the recesses of the micro-lenses.

According to a further aspect of the invention, there is provided a liquid crystal projector comprising a liquid crystal display apparatus according to the invention.

DETAILED DESCRIPTION OF THE PREFERRED EMBODIMENTS

Now, the present invention will be described in greater detail by referring to the accompanying drawings that illustrate preferred embodiments of the invention.

First Embodiment

Figure 1:
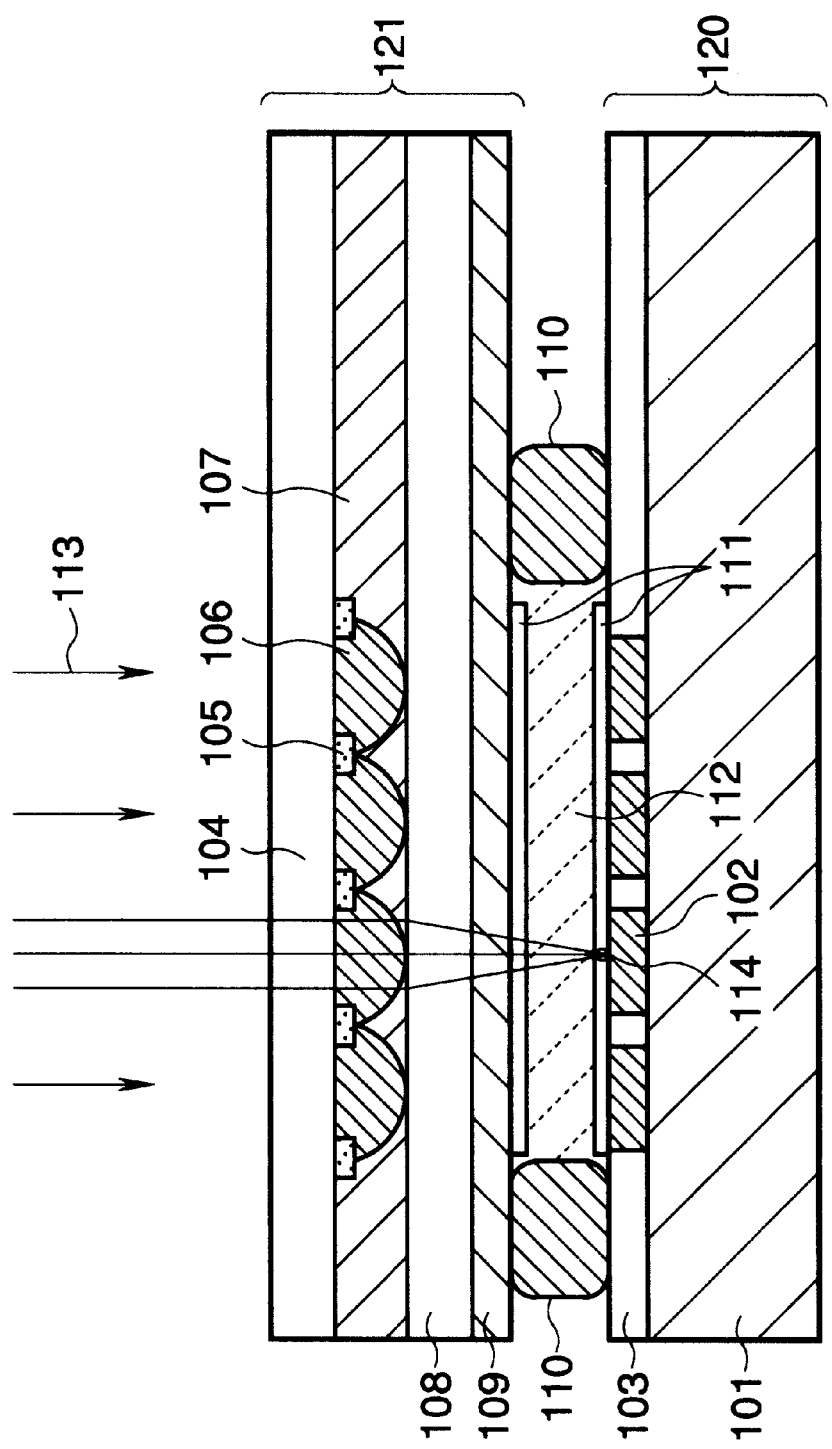
FIG. 1 is a schematic cross sectional view of a first embodiment of liquid crystal display apparatus according to the invention.

FIG. 1 is a schematic cross sectional view of a first embodiment of liquid crystal display apparatus according to the invention. While a circuit substrate for arranging thereon a drive circuit may comprise thin film transistors formed on a transparent substrate, a semiconductor substrate is used for this embodiment. Referring to FIG. 1, reference numeral 101 denotes a semiconductor substrate carrying thereon a drive circuit and pixel transistors arranged for respective pixels (not shown). A pixel electrode 102 is connected to each pixel transistor to apply an intended image signal. While a transparent electrode may be used for the pixel electrode 102, a reflective metal electrode is used for the pixel electrode 102 in this embodiment to realize a reflection type liquid crystal display apparatus. Reference numeral 103 denotes an insulation film. Reference numeral 104 denotes a transparent substrate, on which a light-shielding layer 105 and micro-lenses 106 are formed. The gaps between the micro-lens are filled with a transparent material 107 having a refractive index different from that of the material of the micro-lenses 106 and a glass plate 108 is arranged on the transparent material 107. The transparent material 107 may operate as adhesive for holding the transparent substrate 104, the micro-lenses 106 and the glass plate 108 together. A transparent electroconductive film 109 is formed on the surface of the glass plate 108 and made to show a given electric potential and operate as counter electrode. The transparent substrate 104 and the semiconductor substrate 101 are bonded together by means of a sealing material 110. The portion of the arrangement comprising the semiconductor substrate 101, the pixel electrodes 102 and the insulation film 103 is referred to as circuit substrate 120 hereinafter. An orientation film 111 is formed on the circuit substrate 120 and on the transparent electroconductive film 109 of the transparent substrate side portion 121. Liquid crystal is arranged between the two portions 120, 121 of the arrangement. If appropriate materials are selected for the orientation film 111 and the liquid crystal 112, it is possible to orient the molecules of the liquid crystal 112 vertically when no electric field is applied thereto and horizontally by subjecting them to an electric field between the pixel electrodes 102 and the transparent electroconductive film 109 in order to control the polarization of incident light and display images (the DAP (Deformation of Aligned Phase) system). If such is the case, rays of light coming from the light source 113 are polarized in a desired direction by means of a polarizing plate or a polarizing beam splitter. Since the light-shielding layer 105 is located closer, if slightly, to the light source than the micro-lenses 106 in this embodiment, no light enters the embodiment through peripheral areas of the micro-lenses 106 where aberration can take place. Thus, rays of light entering each of the micro-lenses are focused to a small spot 114 on the corresponding pixel electrode 102. Therefore, no incident light hits the boundary areas of the pixel electrodes where the orientation of liquid crystal molecules cannot be satisfactorily controlled so that consequently the contrast and the brightness of the displayed image will be significantly improved.

Additionally, with the DAP system, light having the direction of polarization rotated by 90° from that of incident light appears bright. In other words, light having the direction of polarization rotated by 180° from that of incident light (or light simply reflected by a mirror) does not significantly and adversely affect the black level. Thus, a light reflecting material may be used for the light-shielding layer 105.

Second Embodiment

Figure 2:
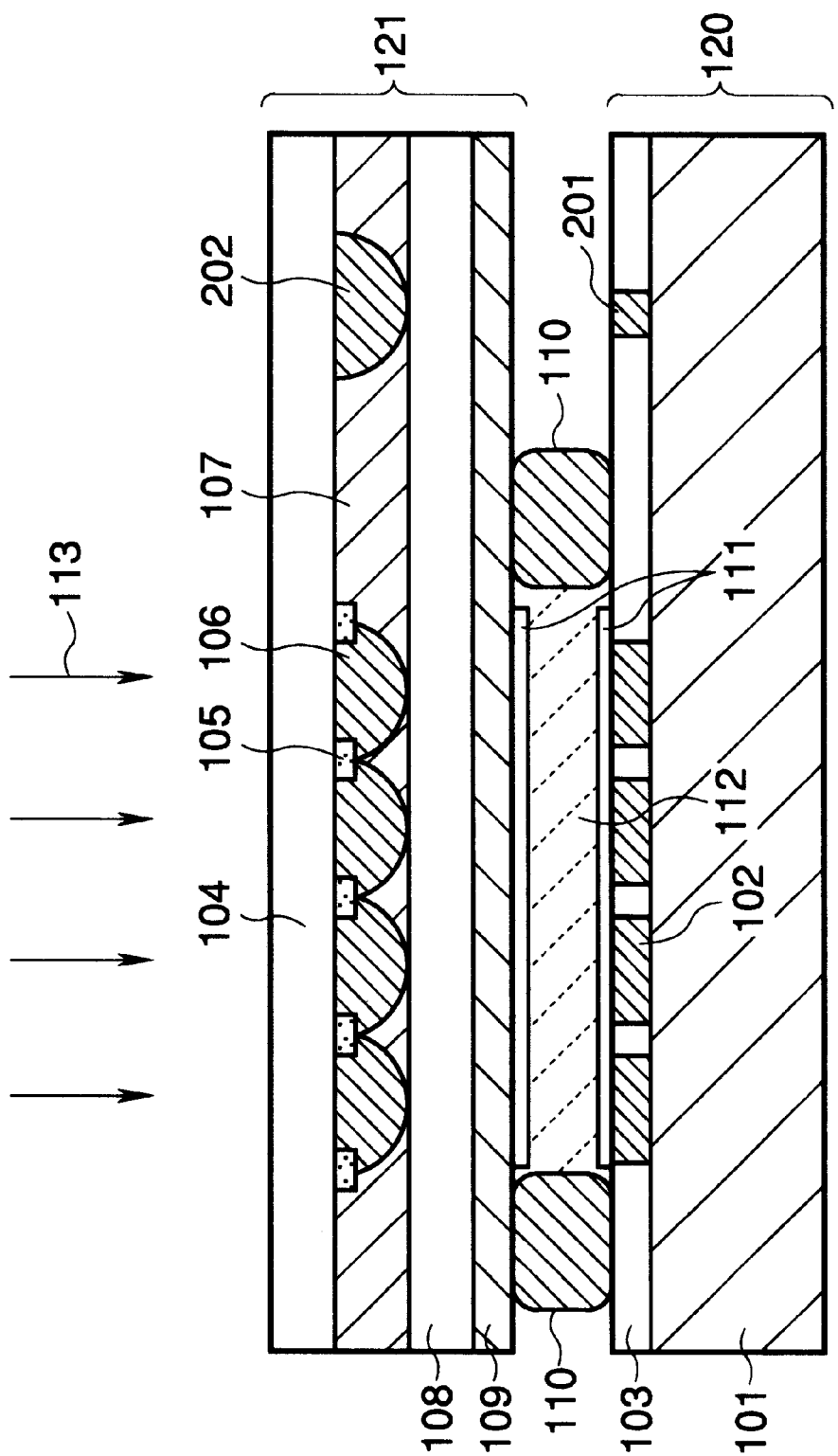
FIG. 2 is a schematic cross sectional view of a second embodiment of liquid crystal display apparatus according to the invention.

According to the invention, it is possible to improve the accuracy of bonding the transparent substrate side portion 121 and the circuit substrate 120. This will be described by referring to FIG. 2 showing a second embodiment of the invention. A number of alignment marks 201 are formed in the circuit substrate 120 although only one of them is shown in FIG. 2. While the alignment marks 201 may be formed in the layer of the pixel electrodes 102, the former are preferably sized smaller than the latter. The positional relationship between the pixel electrodes 102 and the alignment marks 201 can be made invariable by producing both the pixel electrodes 102 and the alignment marks 201 in a same process. Corresponding alignment marks 202 are formed in the transparent substrate side portion 121 and made of the material of the micro-lenses 106. In the bonding process, the transparent substrate side portion 121 and the circuit substrate 120 can accurately aligned with each other and bonded together by using the alignment marks. In this embodiment, the micro-lenses 106 and the alignment marks 202 of the transparent substrate side portion 121 can be produced in a same process to make the positional relationship between the micro-lenses 106 and the alignment marks 202 invariable. If the size of the alignment marks 201 is larger than that of the alignment marks 202, it is easy to align the both substrates comparing with the circumstances the these two alignment marks have the same size. However, if the aberration of the micro-lens 106 can be reduced the size of the alignment marks 201 can be smaller than that of the alignment marks 202 to increase alignment accuracy. While the alignment marks of the transparent substrate side portion 121 and those of the circuit substrate 120 may not be located vis-a-vis respectively, they are preferably arranged exactly vis-a-vis relatively to each other as shown in FIG. 2 so that each of the alignment marks 201 of the circuit substrate 120 may be dimensionally magnified by the corresponding one of the alignment marks 202 of the transparent substrate side portion 121 when the former is located at the focal point of the latter to allow a highly accurate aligning operation to be realized.

Third Embodiment

Figure 3:
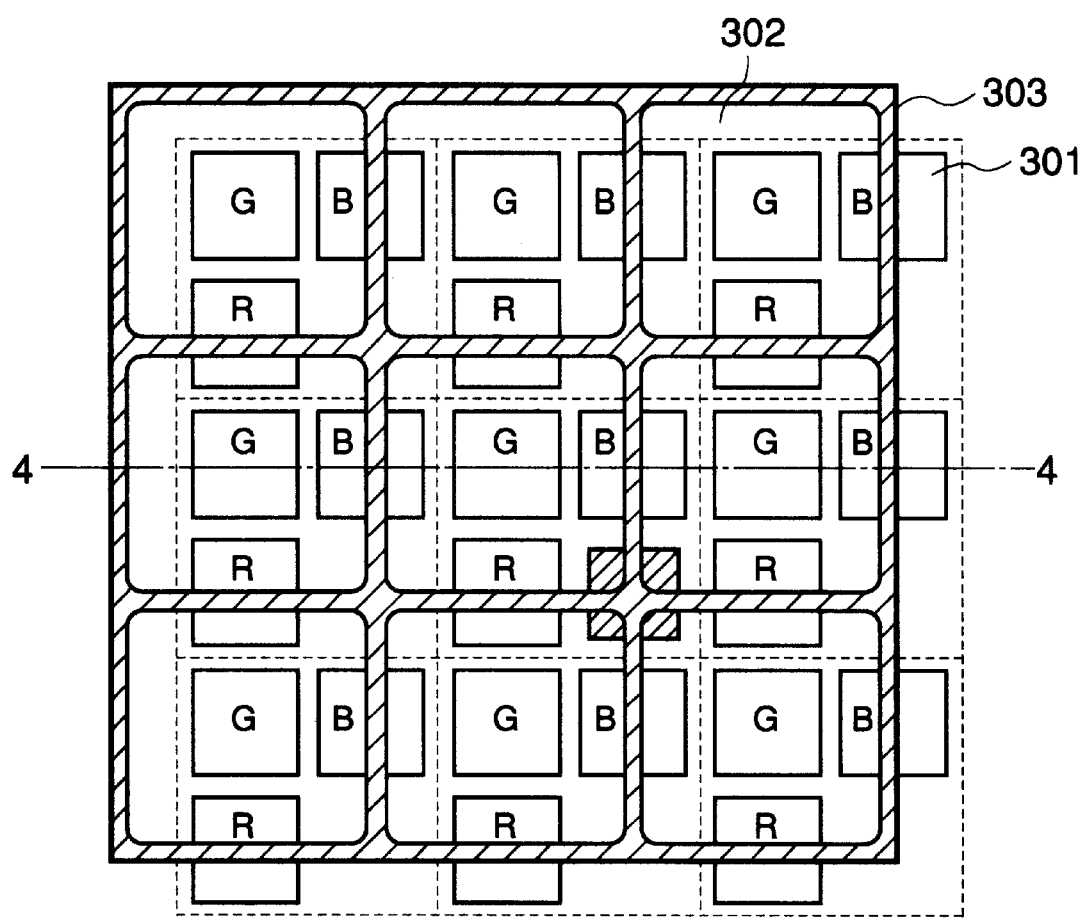
FIG. 3 is a schematic plan view of a third embodiment of liquid crystal display apparatus according to the invention.
Figure 4:
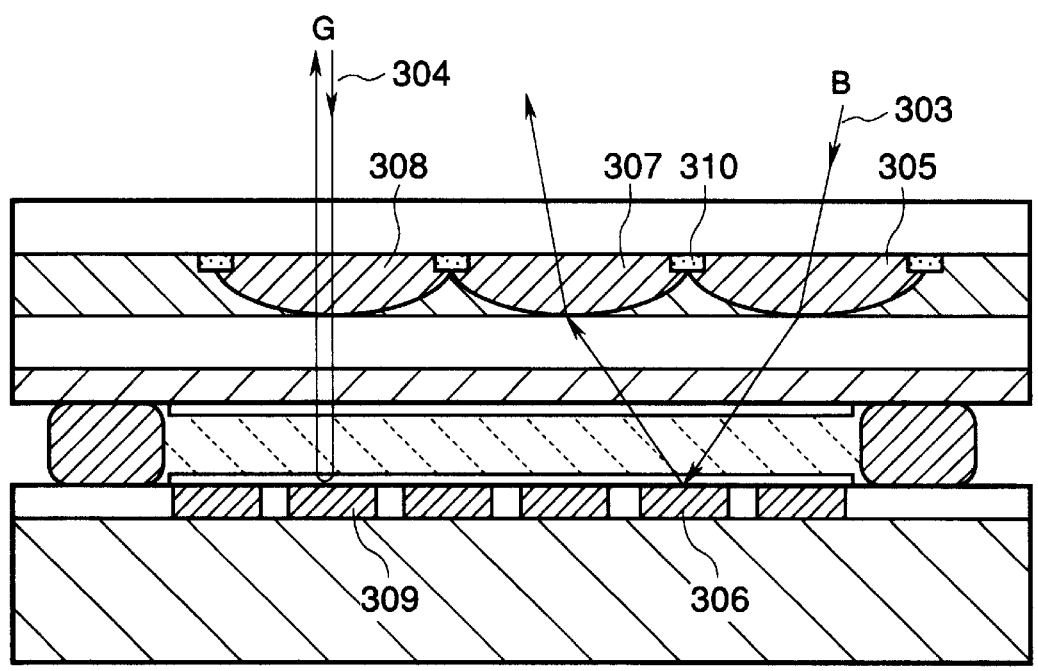
FIG. 4 is a schematic cross sectional view of the third embodiment of liquid crystal display apparatus.

A third embodiment of the invention will be described by referring to FIGS. 3 and 4. FIG. 3 is a schematic plan view of the third embodiment and FIG. 4 is a schematic cross sectional view of the embodiment. There are shown pixel electrodes 301, micro-lenses 302 and a light-shielding layer 303. Note that the pitch of arrangement of micro-lenses 302 of this embodiment is twice as high as that of pixel electrodes 301 both vertically and horizontally. In this embodiment, rays of light of R, G and B from a light source enter the transparent substrate side portion 121 with differentiated respective angles. This will be described by referring to the cross sectional view of FIG. 4. A ray of B light and that of G light are denoted respectively by reference numerals 303 and 304. The ray of B light 303 enters micro-lens 305 and is reflected by pixel electrode 306 before it leaves the transparent substrate side portion 121 through micro-lens 307. On the other hand, the ray of G light 304 enters micro-lens 308 and is reflected by pixel electrode 309 before it leaves the transparent substrate side portion 121 through the same micro-lens 308. Since the pitch of arrangement of micro-lenses is higher than that of pixels in this embodiment, relatively large micro-lenses may be used to allow them to be processed to show a delicately defined profile if minute pixels are used for the display apparatus. However, since rays of light of the three primary colors have to strike the transparent substrate side portion with respective angles of incidence that are different from each other, any conventional arrangement of light-shielding layer having a relatively large surface area for blocking rays of light striking peripheral areas of the micro-lenses that show an enhanced degree of aberration will consequently reduce the brightness of the displayed image. If, on the other hand, the light-shielding layer is made to have a relatively small surface area, rays of light can enter pixel electrodes other than the targeted ones. Imagine, for example, an image where rays of G light produce brightness and rays of B light produce darkness. Since the light-shielding layer has a relatively small surface area, the rays of B light entering a peripheral area of the micro-lens 305 that shows an enhanced degree of aberration can be reflected by pixel electrodes other than the target pixel electrode 306 in FIG. 4 to consequently degrade the color reproducibility of the display apparatus. On the other hand, any rays of light trying to enter a peripheral area of the micro-lens 305 are blocked by the light-shielding layer 310 so that the brightness of the displayed image is improved without degrading the color reproducibility of the display apparatus.

Fourth Embodiment

Figure 5A:
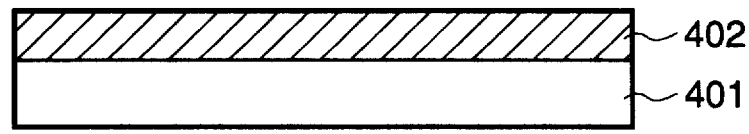
FIGS. 5A, 5B, 5C, 5D and 5E are schematic cross sectional views of a fourth embodiment of liquid crystal display apparatus according to the invention, illustrating the steps of manufacturing it from the transparent substrate side.
Figure 5B:
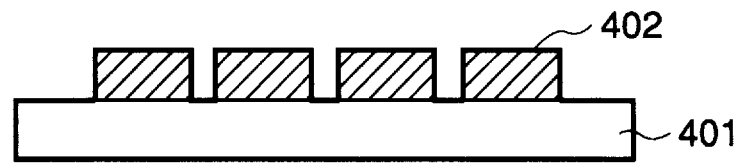
Figure 5C:
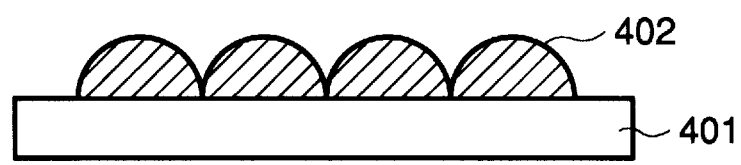
Figure 5D:
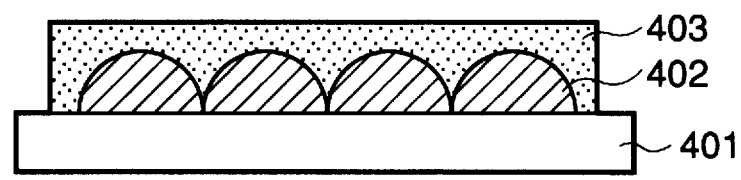

Now, a fourth embodiment of the invention will be described by referring to FIGS. 5A to 5E and FIGS. 6F to 6H. A resin material 402 is applied onto a transparent substrate 401 and patterned to show a desired profile as shown in FIG. 5B by exposing it to light and developing the latent image formed on it. Then, the resin material 402 is molten typically by heat to produce micro-lenses as shown in FIG. 5C, utilizing the surface tension of the resin material 402. Then, a light-shielding material 403 is applied onto the micro-lenses 402. The light-shielding material may be a light reflecting material (FIG. 5D). Subsequently, the light-shielding material is removed by etching or polishing until it is left only in the recesses separating the micro-lenses. Then, a transparent material 404 such as resin is applied onto the surface of the micro-lenses (FIG. 6F) and a glass plate 405 is bonded to it. While an adhesive material may be selected for the transparent material 404, it has to show a desired appropriate refractive index because the difference in the refractive index between the transparent material 404 and the resin material 402 affects the performance of the micro-lenses. Alternatively, the layer 404 may be replaced by void and the glass plate 405 and the micro-lenses 402 may be firmly put together along the periphery of the micro-lens array. With such an arrangement, the difference in the refractive index may take a relatively large value to reduce the focal length of the micro-lenses. Then, a transparent electrode 406 is formed. It is typically made of ITO film (FIG. 6H). It is also possible to form a film layer on the glass plate 405 in advance for the transparent electrode 406 before the glass plate 405 is bonded to the transparent material 404. When a transparent substrate carrying thereon a micro-lens array as shown in FIG. 6H is used for the first or second embodiment, the adverse effect of aberration along the periphery of the micro-lenses can be minimized because rays of light that have been reflected by the reflective electrodes enter the micro-lenses after passing through the openings of the light-shielding layer. A liquid crystal projector comprising conventional micro-lenses shows a poor resolution because rays of light coming from the pixels are scattered due to the aberration of the micro-lenses before they are converged onto the display screen to display an image. It will be appreciated, however, this embodiment can effectively suppress such an undesired phenomenon to display images with an enhanced degree of resolution.

Fifth Embodiment

Figure 7A:
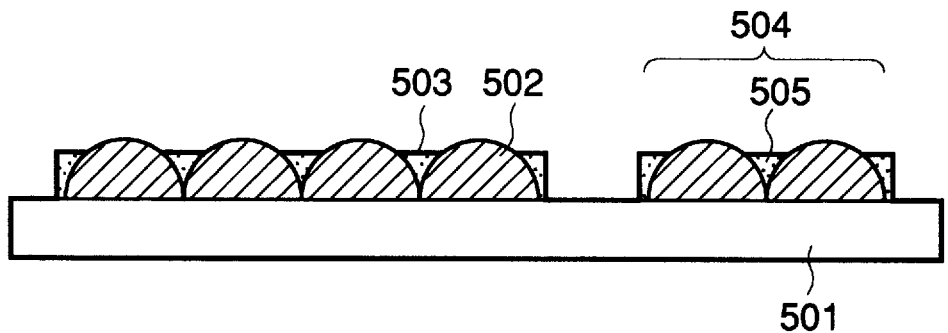
FIGS. 7A and 7B are a schematic cross sectional view and a schematic plan view of a fifth embodiment of liquid crystal display apparatus according to the invention.
Figure 7B:
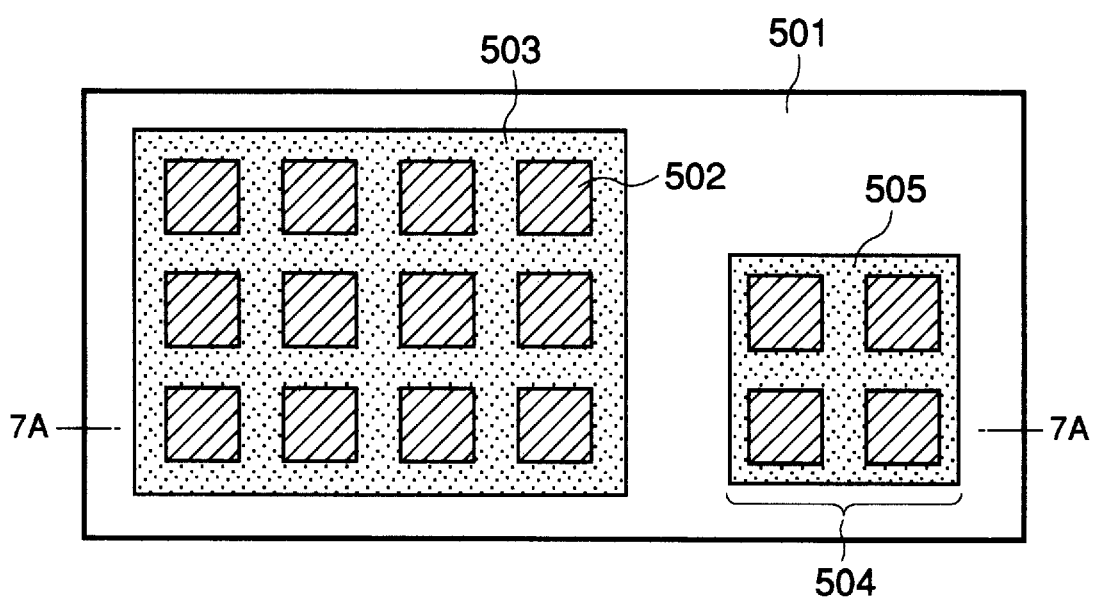

Alignment marks may be formed in the light-shielding layer in the above described fourth embodiment. FIGS. 7A and 7B are a schematic cross sectional view and a schematic plan view of a fifth embodiment of liquid crystal display apparatus according to the invention. Referring to FIGS. 7A and 7B, reference numeral 501 denotes a transparent substrate carrying thereon micro-lenses 502 and a light-shielding layer 503 formed in the recesses separating the micro-lenses 502. Note that the light-shielding layer 505 may also be arranged in the recesses separating the alignment marks 504. With this arrangement, the pieces of the light-shielding layer 505 left in the alignment marks 504 are automatically aligned with the micro-lenses to make the positional relationship between the alignment marks and the micro-lenses invariable. Thus, the transparent substrate and the circuit substrate can be accurately aligned relative to each other and bonded together.

Sixth Embodiment

Figure 5E:
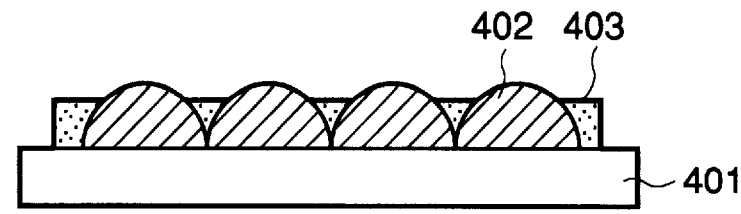
Figure 6F:
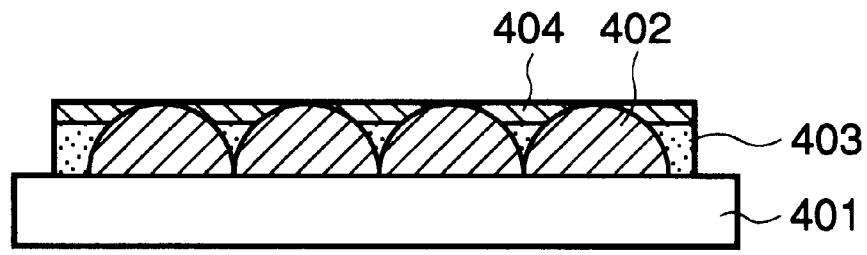
FIGS. 6F, 6G and 6H are schematic cross sectional views of the fourth embodiment of liquid crystal display apparatus, illustrating the manufacturing steps that follow those of FIGS. 5A, 5B, 5C, 5D and 5E.
Figure 6G:
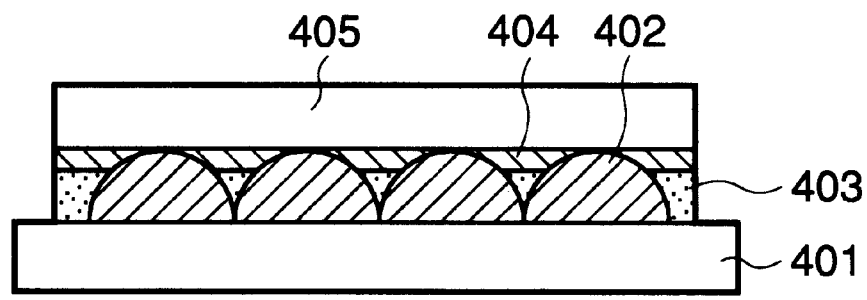
Figure 6H:
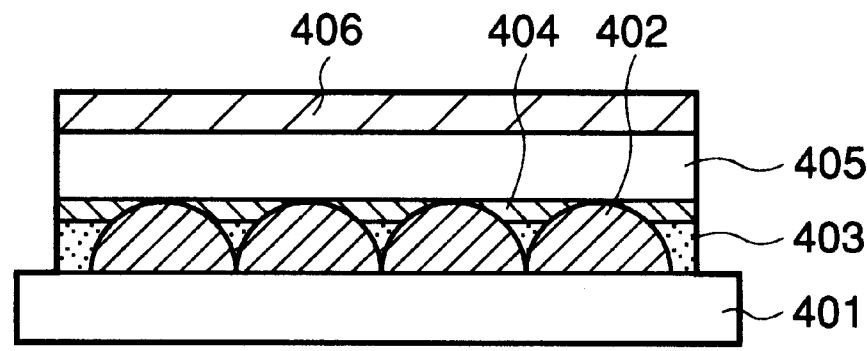
Figure 8A:
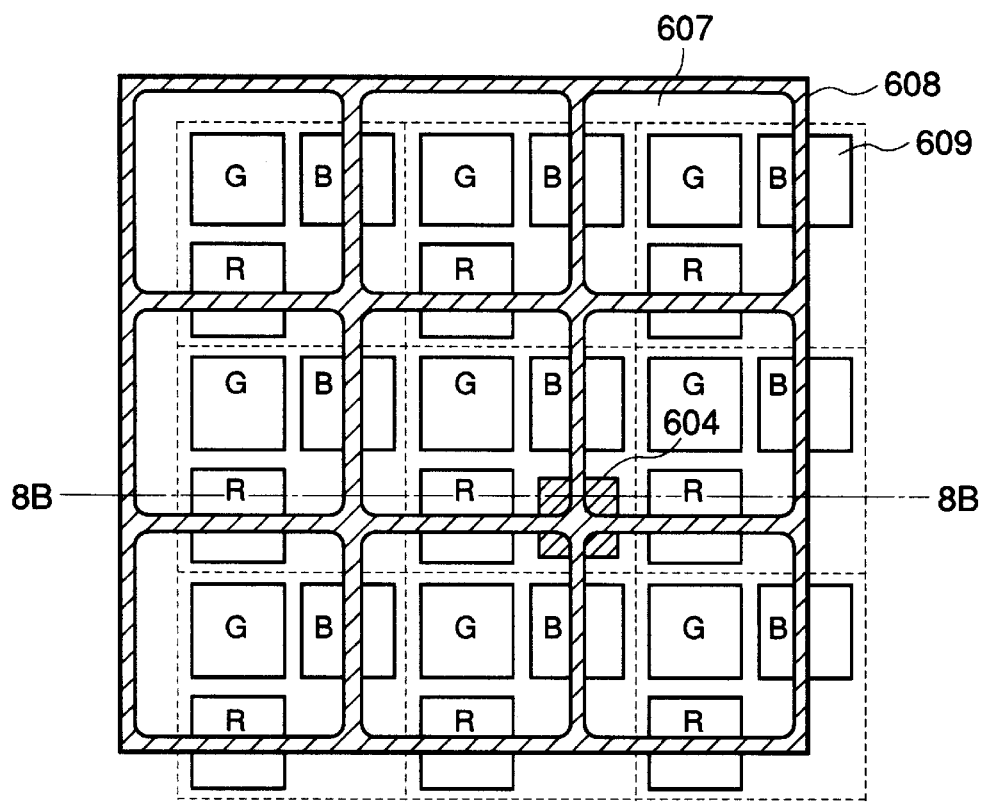
FIGS. 8A and 8B are a schematic cross sectional view and a schematic plan view of a sixth embodiment of liquid crystal display apparatus according to the invention.
Figure 8B:
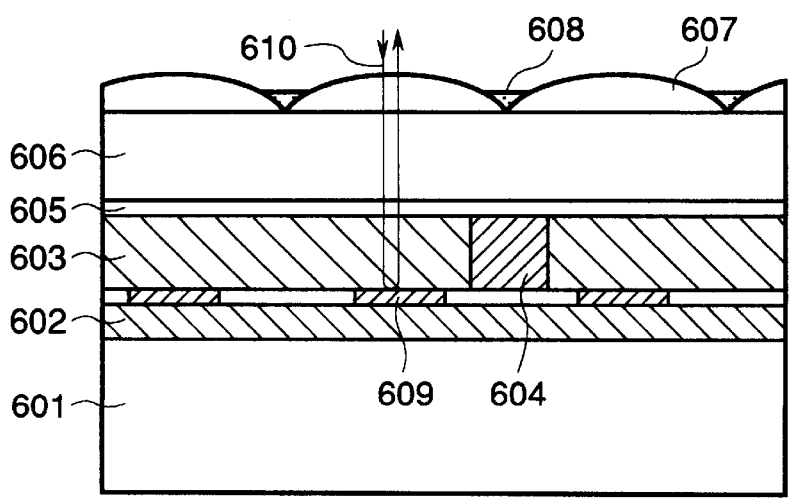

A transparent electrode may be formed on the lower surface of the arrangement of FIG. 5E and applied to the first or second embodiment. FIGS. 8A and 8B show an embodiment realized by applying the arrangement of FIG. 5E to the second embodiment. Referring to FIGS. 8A and 8B, there are shown a semiconductor substrate 601, a region reserved for forming a drive circuit 602, a liquid crystal layer 603, an insulation film layer 604 for defining the width of the liquid crystal layer, a transparent electroconductive film 605, a transparent substrate 606, micro-lenses 607, a light-shielding layer 608 and pixel electrodes 609. Rays of light 610 from a light source trying to enter a peripheral area of the target micro-lens that shows an enhanced degree of aberration are blocked by the light-shielding layer 608 so that well contrasted images that are free from blurred colors can be displayed on the display screen.

Seventh Embodiment

Figure 9:
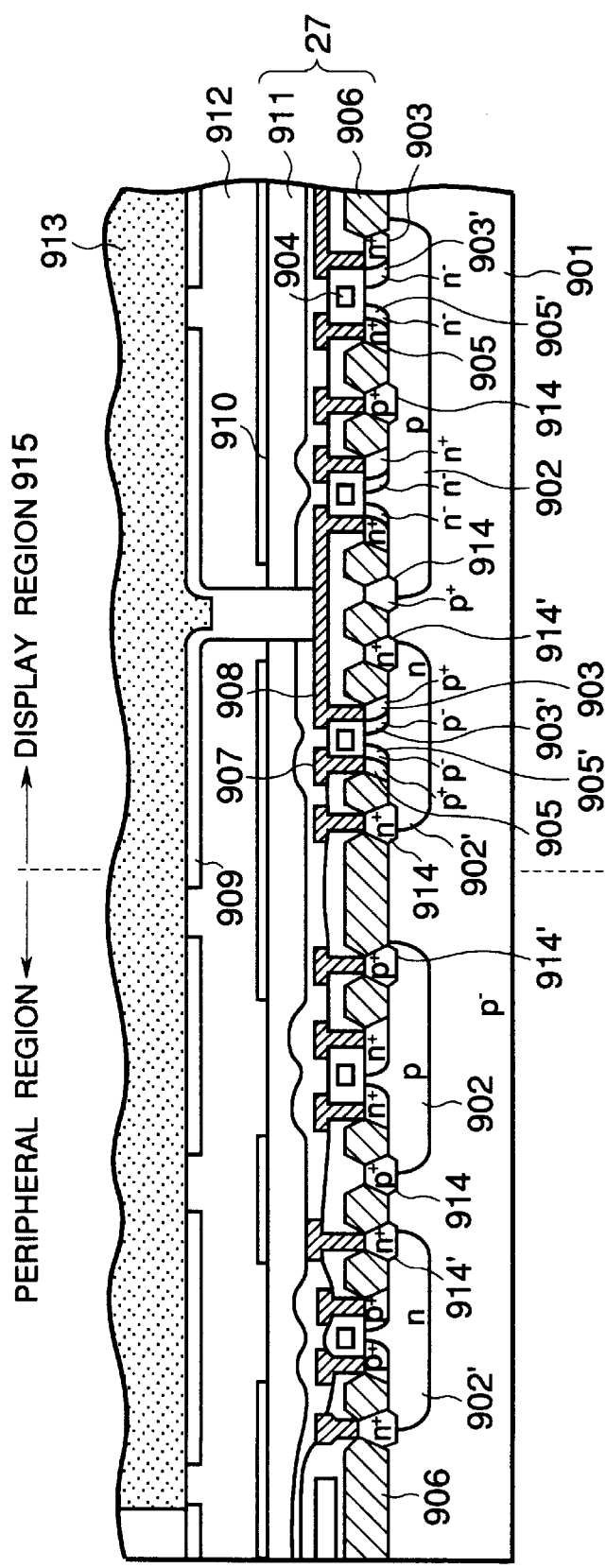
FIG. 9 is a schematic partial cross sectional view of a semiconductor substrate to be used for a liquid crystal display apparatus according to the invention.

This embodiment represents a liquid crystal projector realized by applying a liquid crystal display apparatus according to the invention. FIG. 9 is a schematic cross sectional view of a liquid crystal panel according to the invention. In FIG. 9, there are shown a semiconductor substrate 901, p-type and n-type wells 902, 902', transistor source regions 903, 903', 903", a transistor gate region 904 and transistor drain regions 905, 905', 905". As seen from FIG. 9, the source/drain layer is not formed in a self-aligning manner but arranged with a certain degree of offset relative to the gate of each of the transistors in the display region so that a low concentration n⁻ layer and a low concentration p⁻ layer are formed respectively in the p-well and the n-well located therebetween and denoted by 903' in the source region 903' and by 905' in the drain region. The offset is preferably between 0.5 and 2.0 μm. On the other hand, in the part of the peripheral circuits shown in the left half of FIG. 9, a source/drain layer is formed in a self-aligning manner relative to the gate. While the offset of the source/drain layer is described above, the offset may be modified as a function of their withstand voltages and the gate length may be optimized to maximize the offset effect. Note that the peripheral circuits are partly logic type circuits that are driven typically by 1.5 to 5 V so that the source/drain layer can be formed in self-aligning manner to reduce the dimensions of the transistors and improve the efficiency of driving the transistors. The substrate 901 is made of a p-type semiconductor and shows the lowest potential of the apparatus (normally the ground potential) and a voltage for driving pixels, which is typically between 10 and 15 V, is applied to the n-type wells in the display region, whereas a voltage for driving logics, which is typically between 1.5 and 5 V is applied to the logic sections of the peripheral circuits. With such an arrangement, the devices of the apparatus may be configured optimally depending on the voltage applied thereto to consequently reduce the chip size and improve the speed of driving the pixels for displaying images. Referring to FIG. 9, there are also shown a field oxide film 906, source electrodes 907 to be connected to respective data wires, drain electrodes 908 to be connected to respective pixel electrodes, pixel electrodes 909 operating as so many reflectors, a shield layer 910 for covering both the display region and the peripheral region, which shield layer 910 being typically made of Ti, TiN or Mo. As shown in FIG. 9, the shield layer is removed in areas of the display region where wire capacitances including part of video lines and clock lines are overlapped and the pixel electrode layer is covered only in areas where straying rays of light of illumination can enter to fail the operation of the circuit so that signals may be transferred at high speed.

In FIG. 9, reference numeral 911 denotes an insulation layer of P-SiO arranged under the shield layer and on another P-SiO layer and processed by smoothing operation using an SOG. It may be needless to say that the smoothing process using an SOG can be replaced by a process of forming a P-TEOS (phospho-tetraethoxysilane) film and covering it with a P-SiO layer, which is followed by a CMP process for smoothing the insulation layer.

Reference numeral 912 denotes another insulation layer arranged between the reflective electrodes and the shield layer so that the charge retaining capacitance of the reflective electrodes can be provided by way of this insulation layer. A laminate film comprising P-SiN and/or $Ta_2O_5$ layers having a high dielectric constant may effectively be used in addition to or in place of an $SiO_2$ layer to generate a large capacitance. The shield layer of Ti, TiN, Mo or W formed on a smooth surface preferably has a film thickness between 500 and 5,000 angstroms.

Otherwise, there are also shown a liquid crystal layer 913, high concentration impurity regions 914, 914' and a display region 915.

As shown in FIG. 9, the high concentration impurity regions 914, 914' having a polarity same as that of the wells and formed under the transistors are located in and on the peripheries of the wells and operate as a sort of guard rings so that, if a high frequency signal is applied to the sources of the transistors, they operate stably to produce high quality images because the potential of the wells are stably held to a desired low level by the low resistance layer. Additionally, said high concentration impurity regions 914, 914' are arranged between the n-type well and the p-type well with the field oxide film interposed there between to eliminate the use of a channel stop layer that is typically used for ordinary MOS transistors and arranged right under the field oxide film.

Since the high concentration impurity regions can be formed during the process of producing the source/drain layer, the overall number of masks and that of processing steps required for manufacturing the apparatus can be reduced to consequently reduce the manufacturing cost.

Figure 10A:
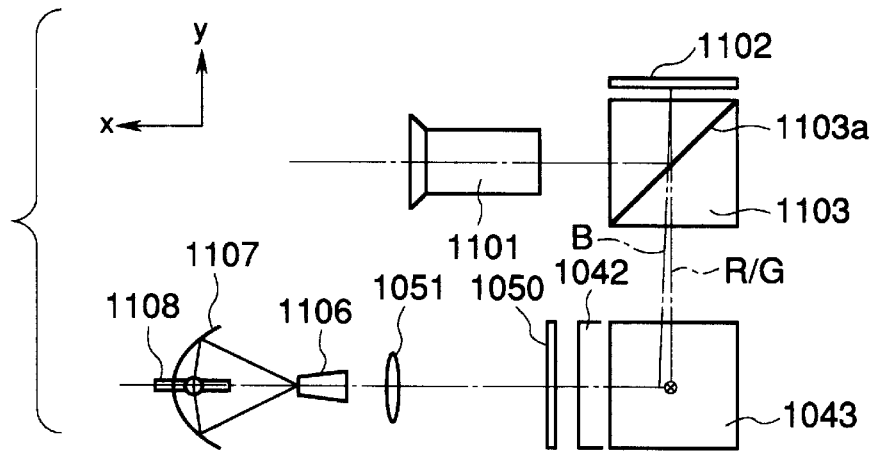
FIGS. 10A, 10B and 10C are schematic illustrations of the optical system of a reflection type liquid crystal display apparatus according to the invention, showing the paths of rays of light of the three primary colors.
Figure 10B:
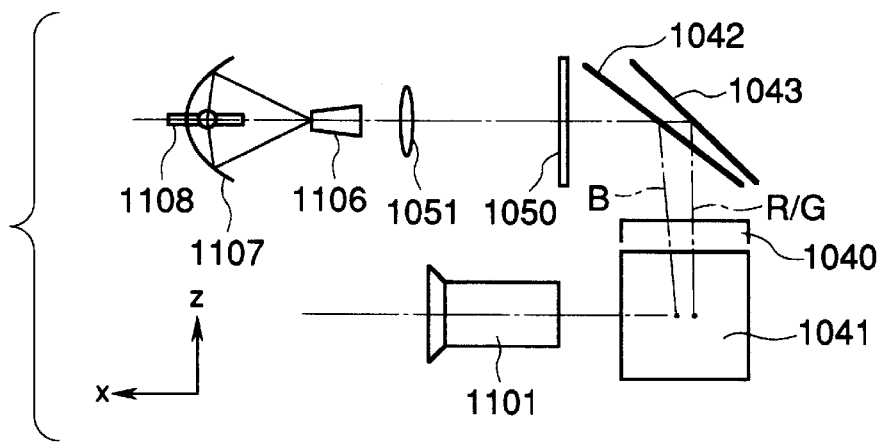
Figure 10C:
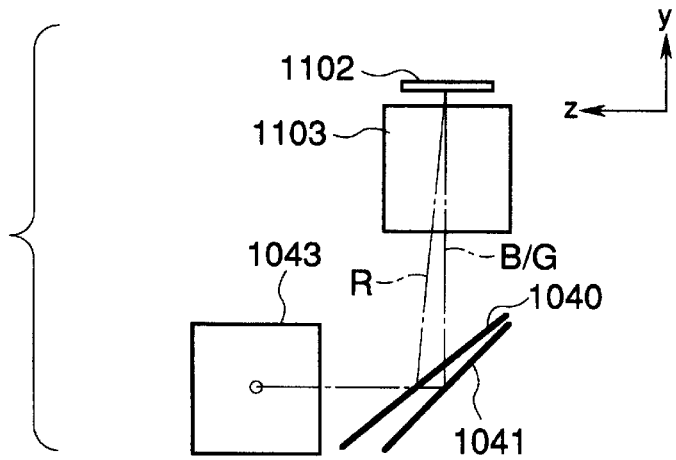

FIGS. 10A to 10C are schematic illustrations of the optical system of an embodiment of projection type liquid crystal display apparatus according to the invention. In FIGS. 10A to 10C, FIG. 10A shows a plan view, FIG. 10B shows a front view and FIG. 10C shows a side view. Referring to FIGS. 10A to 10C, their are shown a projection lens 1101 and a liquid crystal panel 1102 comprising micro-lenses according to the invention that can be realized by combining micro-lenses, a transparent substrate and a circuit substrate with any of the above described first through sixth embodiments.

There are also shown a polarization beam splitter (PBS) 1103, an R (red light) reflecting dichoric mirror 1040, a B/G (blue and green light) reflecting dichroic mirror 1041, a B (blue light) reflecting dichroic mirror 1042, a white light reflecting high reflection mirror 1043, a Fresnel lens 1050, a convex lens 1051, a rod type integrator 1106, an elliptic reflector 1107, an arc lamp 1108 of, for example, metal halide or UHP. Note that the R (red light) reflecting dichroic mirror 1040, the B/G (blue and green light) reflecting dichroic mirror 1041 and the B (blue light) reflecting dichroic mirror 1042 have respective spectrum reflection characteristics illustrated in FIGS. 11A to 11C. The dichroic mirrors and the high reflection mirror 1043 are three-dimensionally arranged as shown in the perspective view of FIG. 12 to divide illuminated white light and separate R, G and B light as will be described hereinafter and cause rays of light of the three primary colors to irradiate the liquid crystal panel 1102 with respective angles that are three-dimensionally different from each other.

The operation of the optical system will be described in terms of the proceeding route of a flux of light. Firstly, the flux of light emitted from the lamp 1108 of the light source of the system is that of white light and converged by the elliptic reflector 1107 toward the inlet port of the integrator 1106 arranged in front of it. As the flux of light proceeds through the integrator 1106 with repeated reflections, the spatial intensity distribution of the flux of light is uniformized. After coming out of the integrator 1106, the flux of light is collimated along the x-direction (as shown in the front view in FIG. 10B) by the convex lens 1051 and the Fresnel lens 1050 before getting to the B reflecting dichroic mirror 1042. Only B light (blue light) is reflected by the B reflecting dichroic mirror 1042 and directed to the R reflecting dichroic mirror 1040 along the z-axis or downwardly in FIG. 10B, showing a predetermined angle relative to the z-axis. Meanwhile, light than B light (R/G light) passes through the B reflecting dichroic mirror 1042 and reflected rectangularly by the high reflection mirror 1043 into the direction of the z-axis (downwardly) and also directed to the R reflecting dichroic mirror 1040. Referring to the front view in FIG. 10A, both the B reflecting dichroic mirror 1042 and the high reflection mirror 1043 are arranged to reflect the flux of light coming from the integrator 1106 (along the direction of the x-axis) into the direction of the z-axis (downwardly), the high reflection mirror 1043 being tilted around the axis of rotation, or the y-axis, exactly by 45° relative to the x-y plane. On the other hand, the B reflecting dichroic mirror 1042 is tilted around the axis of rotation, or the y-axis, by an angle less than 45° relative to the x-y plane. Thus, while R/G light reflected by the high reflection mirror 1043 is directed rectangularly toward the z-axis, B light reflected by the B reflecting dichroic mirror 1042 is directed downwardly, showing a predetermined angle relative to the z-axis (tilted in the x-z plane). Note that the extent of shifting the high reflection mirror 1043 and the B reflecting dichroic mirror 1042 relative to each other and the angle of tilt of the B reflecting dichroic mirror will be so selected that the principal beams of light of the three primary colors intersect each other on the liquid crystal panel 1102 in order to make B light and R/B light show an identical coverage on the liquid crystal panel 1102.

Figure 11A:
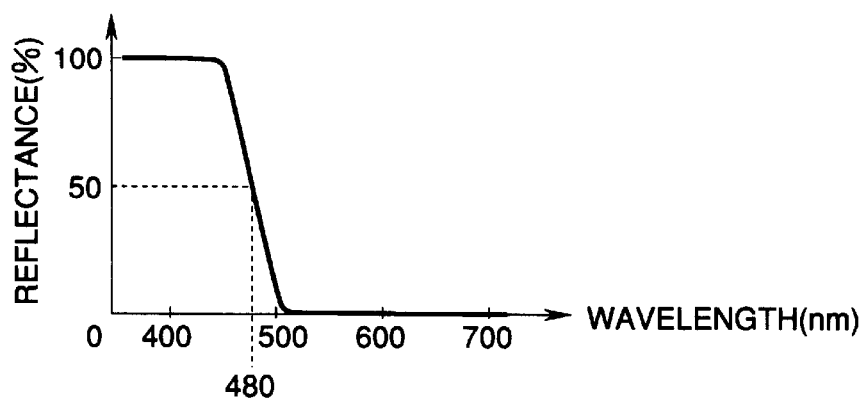
FIGS. 11A, 11B and 11C are graphs showing the spectral reflection characteristics of the reflective dichroic mirrors used for the optical system of a projection type liquid crystal display apparatus according to the invention.
Figure 11B:
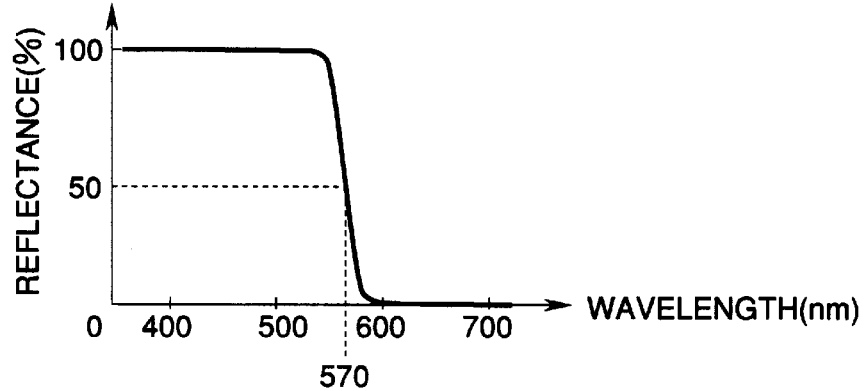
Figure 11C:
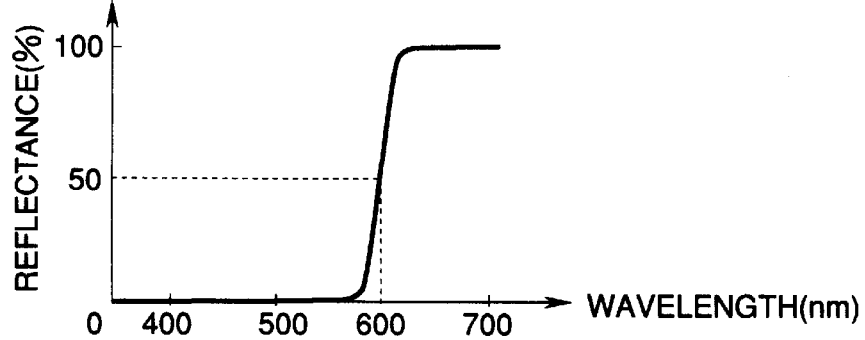
Figure 12:
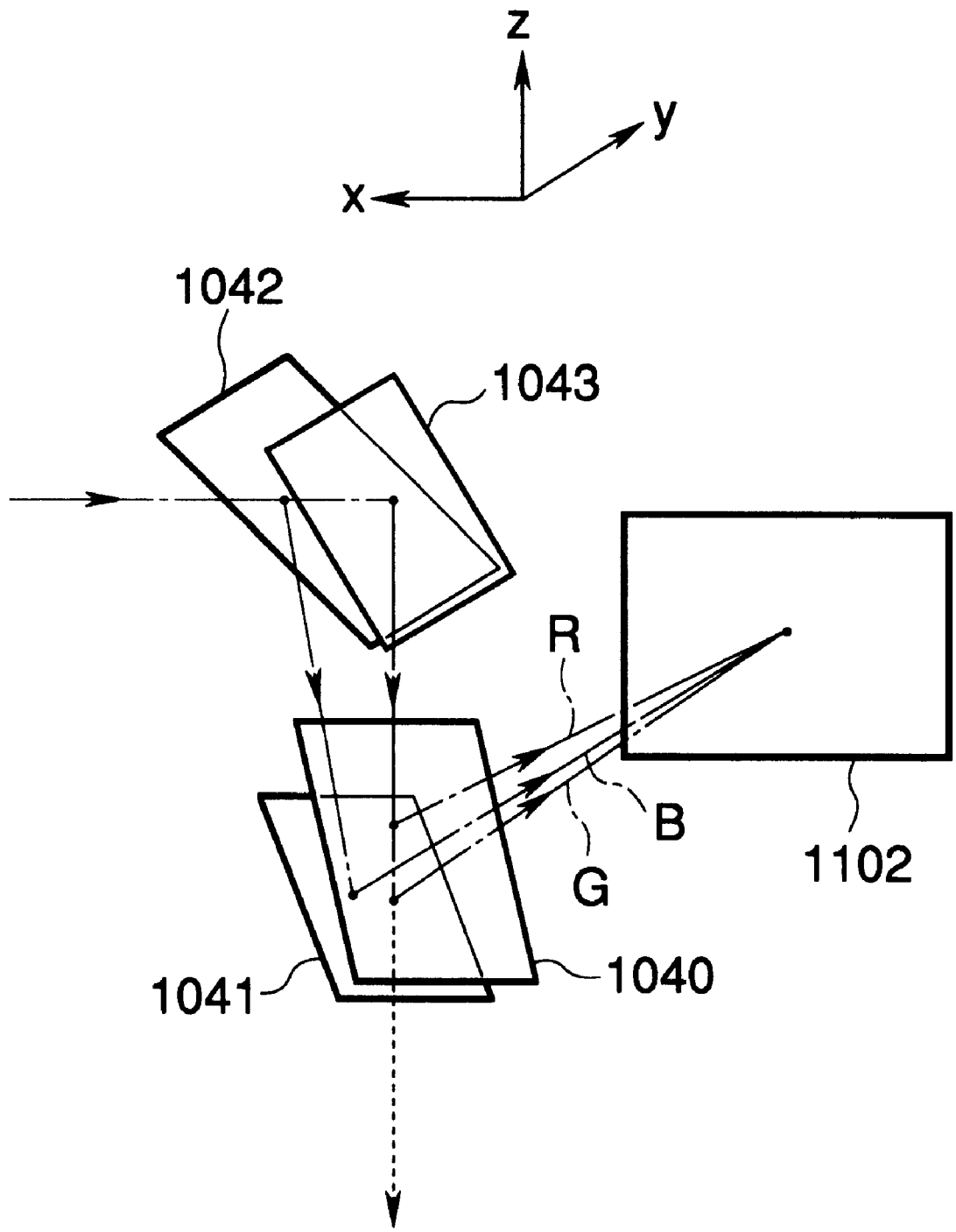
FIG. 12 is a schematic perspective view of the optical system of a transmission type liquid crystal display apparatus according to the invention, showing the paths of rays of light of the three primary colors.
Figure 13:
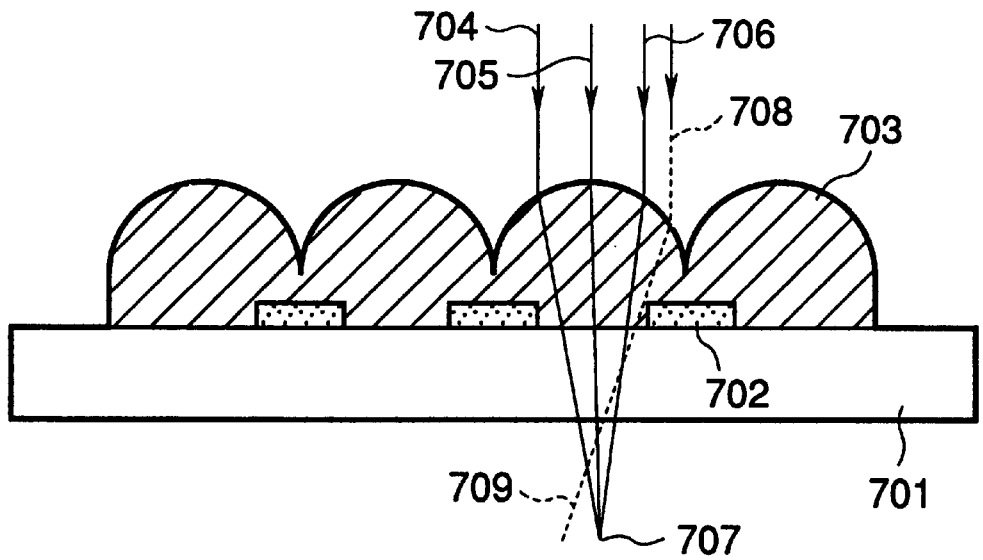
FIG. 13 is a schematic cross sectional view of known micro-lenses.
Figure 14:
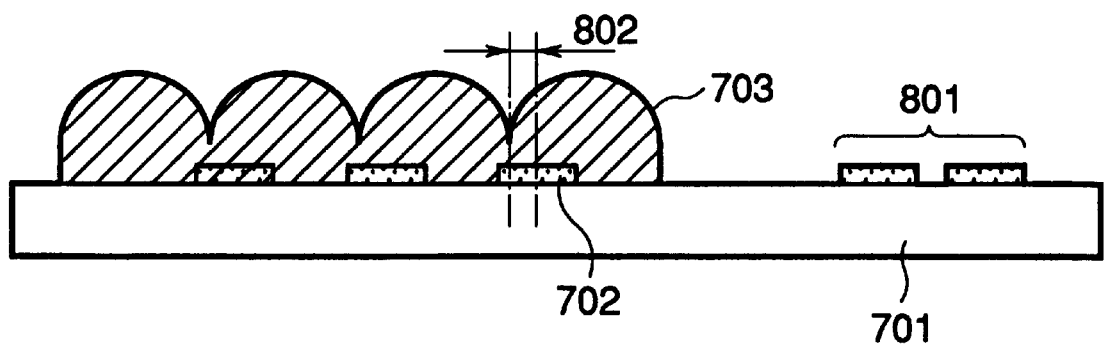
FIG. 14 is a schematic cross sectional view of known micro-lenses, illustrating how misalignment occurs.

The downwardly directed fluxes of R/G/B light (along the z-axis) then proceeds to the R reflecting dichroic mirror 1040 and the B/G reflecting dichroic mirror 1041, which are located below the B reflecting dichroic mirror 1042 and the high reflection mirror 1043. The B/G reflecting dichroic mirror 1041 is tilted around the axis of rotation, or the x-axis by 45° relative to the x-z plane, whereas the R reflecting dichroic mirror 1040 is tilted around the axis of rotation, or the x-axis, by an angle less than 45° relative to the x-z plane. Thus, of the incoming fluxes of R/G/B light, those of B/G light firstly pass through the R reflecting dichroic mirror 1040 and reflected rectangularly by the B/G reflecting dichroic mirror 1041 into the positive direction of the y-axis before they are polarized and illuminate the liquid crystal panel 1102 arranged horizontally on the x-z plane. Of the fluxes of B/G light, that of B light shows a predetermined angle relative to the x-axis (tilted in the x-z plane) as described above (see FIGS. 10A and 10B) so that, after having been reflected by the B/G reflecting dichroic mirror 1041, it maintains the predetermined angle relative to the y-axis (tilted in the x-y plane) and illuminates the liquid crystal panel 1102 with an angle of incidence equal to the predetermined angle (relative to the x-y plane). On the other hand, the flux of G light is reflected rectangularly by the B/G reflecting dichroic mirror 1041 and proceeds into the positive direction of the y-axis before it is polarized and hits the liquid crystal panel 1102 perpendicularly with an angle of incidence of 0°. The flux of R light is reflected by the R reflecting dichroic mirror 1040 which is arranged upstream relative to the B/G reflecting dichroic mirror 1041 as pointed out above into the positive direction of the y-axis and proceeds along the positive direction of the y-axis, showing a predetermined angle relative to the y-axis (tilted in the y-z plane) as shown in FIG. 10C (lateral view) before it is polarized by the PBS 1103 and hits the liquid crystal panel 1102 with an angle incidence equal to the predetermined angle (relative to the y-z plane). As pointed out above, the extent of shifting the B/G reflecting dichroic mirror 1041 and the R reflecting dichroic mirror 1040 relative to each other and the angle of tilt of the R reflecting dichroic mirror will be so selected that the principal beams of light of the three primary colors intersect each other on the liquid crystal panel 1102 in order to make the fluxes of R/G/G light show an identical coverage on the liquid crystal panel 1102. The cutting frequency of the B reflecting dichroic mirror 1042 is 480 nm as shown in FIG. 11A and that of the B/G reflecting dichroic mirror 1041 is 570 nm as shown in FIG. 11B, whereas that of the R reflecting dichroic mirror 1040 is 600 nm. Thus, unnecessary orange light is discarded after passing through the B/G reflecting dichroic mirror 1041 to realize an optimal color balance.

As described in greater detail hereinafter, rays of R/G/B light are reflected and polarized for modulation by the liquid crystal panel 1102 and return to the PBS 1103, where the fluxes reflected into the positive direction of the x-axis by the PBS plane 1003a of the PBS 1103 are used as light for producing enlarged and projected images on the screen (not shown) by way of the projection lens 1101.

Since the fluxes of R/G/B light striking the liquid crystal panel 1102 have respective angles of incidence that are different from each other, the fluxes of light reflected by it and coming out therefrom shows respective angles that are also different from each other. However, the projection lens 1101 has a lens diameter and an aperture that are large enough for accommodating the differences. Note that the fluxes of light striking the projection lens 1101 are collimated as they pass through the micro-lens array twice per each to maintain a predetermined angle for striking the liquid crystal panel 1102. With known transmission type liquid crystal display apparatus, the flux of light exiting the liquid crystal panel is diametrically significantly enlarged partly due to the converging effect of the micro-lens array so that the projection lens for catching the flux is required to have a greater numerical aperture, making the projection lens costly. On the other hand, with this embodiment, the expansion of the flux of light coming from the liquid crystal panel is relatively limited so that a sufficiently bright image can be projected on the screen by using a projection lens having a relatively small numerical aperture.

While the present invention is described above in detail by referring to preferred embodiments, the described embodiments may be modified and/or combined appropriately without departing from the scope of the invention. For example, the fifth embodiment may be applied to the sixth embodiment to produce alignment marks 504 as shown in FIGS. 7A and 7B to the transparent substrate side portion of FIGS. 8A and 8B.

ADVANTAGES OF THE INVENTION

A liquid crystal display apparatus comprising microlenses according to the invention can display images with an enhanced degree of brightness, contrast and resolution as the adverse effect of peripheral areas of the micro-lenses is minimized while maximizing the efficiency of utilization of light. The advantages of the present invention can be fully exploited when such a liquid crystal display apparatus is used in a reflection type liquid crystal projector.

What is claimed is:

1. A liquid crystal display apparatus comprising:
   a light source,
   a transparent substrate carrying thereon a light-shielding layer adapted to selectively block parallel rays of light emitted from the light source and a micro-lens array,
   a circuit substrate, and
   liquid crystal between said transparent substrate and said circuit substrate, wherein
   said liquid crystal is driven by pixel electrodes on said circuit substrate to modulate the rays of light from the light source and thereby display optical images, and said light-shielding layer has corresponding apertures through which pass only the parallel rays of light entering a central area of the micro-lenses so as to reduce an adverse effect of peripheral areas of the micro-lenses, the parallel rays of light from the light source passing through the respective micro-lenses after passing through the corresponding apertures and before entering the liquid crystal.

2. A liquid crystal display apparatus according to claim 1, wherein each of said micro-lenses has a curved surface for converging rays of light from the light source and the rays of light from the light source pass through the respective curved surfaces of the micro-lenses after passing through the corresponding apertures of said light-shielding layer and before entering the liquid crystal.

3. A liquid crystal display apparatus according to claim 1, wherein said rays of light from said light source enter the respective micro-lenses in a plurality of different directions and said micro-lenses are arranged having a pitch which is an integer-fold of a pitch of arrangement of said pixel electrodes.

4. A liquid crystal display apparatus according to any of claims 1–3, wherein a pitch of arrangement of said micro-lenses is an integer-fold of a pitch of arrangement of said pixel electrodes.

5. A liquid crystal display apparatus according to claim 4, wherein said integer is 2.

6. A liquid crystal display apparatus according to any one of claims 1–3, further comprising alignment marks formed on said circuit substrate during the process of forming said plurality of pixel electrodes and having a same profile as that of the pixel electrodes, and alignment marks formed on said transparent substrate during the process of forming said plurality of micro-lenses and having a same profile as that of the micro-lenses, wherein said alignment marks on said circuit substrate and said alignment marks on said transparent substrate are respectively adapted to be aligned relative to each other.

7. A liquid crystal display apparatus according to claim 6 wherein said alignment marks on said transparent substrate are formed using a same material as that of said micro-lenses.

8. A liquid crystal display apparatus according to claim 6, wherein said alignment marks are formed on said transparent substrate using a same material as that of said light-shielding layer.

9. A liquid crystal display apparatus comprising:

a plurality of pixel electrodes adapted to be charged with electricity according to video signals and arranged in two-dimensions on a semiconductor substrate, a liquid crystal layer arranged on said plurality of pixel electrodes, a transparent electroconductive film arranged on said liquid crystal layer, a plurality of micro-lenses adapted to focus parallel rays of polarized light entering them from above, said plurality of micro-lenses being provided on corresponding pixel electrodes and being arranged on a transparent substrate above said transparent electroconductive film, and a light-shielding layer arranged on said plurality of micro-lenses having apertures through which pass only the parallel rays of light entering central areas of the micro-lenses to block the rays of light entering a peripheral area of each of said plurality of micro-lenses so as to reduce an adverse effect of peripheral areas of the micro-lenses whereby the parallel rays of light from the apertures pass through the micro-lenses before entering the liquid crystal layer.

10. A liquid crystal display apparatus comprising:

a plurality of pixel electrodes adapted to be charged with electricity according to video signals and arranged in two-dimensions on a semiconductor substrate, a liquid crystal layer arranged on said plurality of pixel electrodes, a transparent electroconductive film arranged on said liquid crystal layer, and a plurality of micro-lenses adapted to focus parallel rays of polarized light entering them from above, said plurality of micro-lenses being provided on corresponding pixel electrodes and being arranged on a transparent substrate above said transparent electroconductive film, wherein said plurality of micro-lenses have upper and lower surfaces are planar in at their upper surfaces and convex at their lower surfaces, with a light-shielding layer in recesses at boundaries of said micro-lenses having apertures through which pass only the parallel rays of light entering central areas of the micro-lenses in order to block the parallel rays of light from entering a peripheral area of the micro-lenses so as to reduce an adverse effect of peripheral areas of the micro-lenses whereby the parallel rays of light from the apertures pass through the micro-lenses before entering the liquid crystal layer.

11. A liquid crystal display apparatus comprising:

a plurality of pixel electrodes adapted to be charged with electricity according to video signals and arranged in two-dimensions on a semiconductor substrate, a liquid crystal layer arranged on said plurality of pixel electrodes, a transparent electroconductive film arranged on said liquid crystal layer, and a plurality of micro-lenses adapted to focus parallel rays of polarized light entering them from above, said plurality of micro-lenses being provided on corresponding pixel electrodes and being arranged on a transparent substrate above said transparent electroconductive film, wherein said plurality of micro-lenses have upper and lower surfaces and said are convex at their upper surfaces and planar at their lower surfaces, with a light-shielding layer in recesses at boundaries of said micro-lenses having apertures through which pass only the parallel rays of light entering central areas of the micro-lenses in order to block the parallel rays of light from entering a peripheral area of the micro-lenses so as to reduce an adverse effect of peripheral areas of the micro-lenses whereby the parallel rays of light from the apertures pass through the micro-lenses before entering the liquid crystal layer.

12. A liquid crystal display apparatus according to any one of claims 9–11, further comprising alignment marks formed on said semiconductor substrate during the process of forming said plurality of pixel electrodes and having a same profile as that of the pixel electrodes; and alignment marks formed on said transparent substrate during the process of forming said plurality of micro-lenses and having a same profile as that of the micro-lenses, wherein said alignment marks on said semiconductor substrate and said alignment marks on said transparent substrate are respectively adapted to be aligned relative to each other.

13. A liquid crystal display apparatus according to claim 12, wherein said alignment marks on said transparent substrate are formed using a same material as that of said micro-lenses.

14. A liquid crystal display apparatus according to claim 12, wherein said alignment marks are formed on said transparent substrate using a same material as that of said light-shielding layer.

15. A liquid crystal display apparatus according to claim 12, wherein a pitch of arrangement of said micro-lenses is an integer-fold of a pitch of arrangement of said pixel electrodes.

16. A liquid crystal display apparatus according to claim 15, wherein said integer is 2.

17. A method of forming micro-lenses and a light-shielding layer in a liquid crystal display apparatus according to claim 10 or 11, comprising the steps of:

applying a resin material onto the transparent substrate;

removing the resin material by exposure or development from the boundaries of the micro-lenses to be formed;

forming micro-lenses by melting said resin material and utilizing the surface tension of the molten resin material;

applying a light-shielding material onto said micro-lenses; and removing said light-shielding material by etching or polishing except the recesses of said micro-lenses.

18. A method of manufacturing a liquid crystal display apparatus, comprising the steps of:

forming a light-shielding layer on a plurality of micro-lenses showing projections and recesses by applying a light-reflecting or light-shielding material to cover said projections and recesses; and removing said light-reflecting or light-shielding material by polishing or etching except at the recesses, wherein said light-shielding layer blocks the parallel rays of light entering a peripheral area of each of said plurality of micro-lenses so as to reduce an adverse effect of peripheral areas of the micro-lenses.

* * * * *

UNITED STATES PATENT AND TRADEMARK OFFICE
CERTIFICATE OF CORRECTION

PATENT NO.     : 6,295,107 B1
DATED          : September 25, 2001
INVENTOR(S)    : Takanori Watanabe et al.

It is certified that error appears in the above-identified patent and that said Letters Patent is hereby corrected as shown below:

Column 1,
Line 18, "lenses produced by" should be deleted;
Line 24, "the-accompanying" should read -- the accompanying --;
Line 39, "is" should read -- are --;
Line 40, "follows" should read -- follow --; and
Line 41, "because of" should read -- because --.

Column 2,
Line 16, "micron" should read -- microns --; and
Line 54, "have" should read -- has --.

Column 6,
Line 41, "can" should read -- can be --;
Line 48, "the" (second occurrence) should be deleted;
Line 49, "substrates" should read -- substrates, --; and "the" (second occurrence) should read -- that --.

Column 10,
Line 10, "there between" should read -- therebetween --;
Line 24, "their" should read -- there --;
Line 66, "light than" should read -- light other than --; and
Line 67, "reflected" should read -- is reflected --.

Column 11,
Line 2, "also" should read -- are also --; and
Line 36, "and" should read -- and is --.

Column 12,
Line 19, 'shows" should read -- show --.

Column 13,
Line 42, "claim 6" should read -- claim 6, --.

UNITED STATES PATENT AND TRADEMARK OFFICE
CERTIFICATE OF CORRECTION

PATENT NO. : 6,295,107 B1
DATED : September 25, 2001
INVENTOR(S) : Takanori Watanabe et al.

It is certified that error appears in the above-identified patent and that said Letters Patent is hereby corrected as shown below:

Column 14,
Line 24, "are" should read -- which are --; and
Line 51, "said" should read -- which --.

Signed and Sealed this

First Day of April, 2003

JAMES E. ROGAN
*Director of the United States Patent and Trademark Office*